US009711043B2

(12) United States Patent
Moschopoulos et al.

(10) Patent No.: US 9,711,043 B2
(45) Date of Patent: Jul. 18, 2017

(54) INFRA-RED WIRELESS COMMUNICATION

(71) Applicant: Dialog Semiconductor B.V., 's-Hertogenbosch (NL)

(72) Inventors: Nikolaos Moschopoulos, Koridallos (GR); Ioannis Sifnaios, Galatsi (GR); Konstantinos Ninos, Paleo Faliro (GR)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 18 days.

(21) Appl. No.: 14/743,446

(22) Filed: Jun. 18, 2015

(65) Prior Publication Data

US 2016/0371972 A1 Dec. 22, 2016

(51) Int. Cl.
*H04B 10/00* (2013.01)
*G08C 23/04* (2006.01)

(52) U.S. Cl.
CPC .................................... *G08C 23/04* (2013.01)

(58) Field of Classification Search
CPC ............................ G08C 2201/92; G08C 23/04
USPC .......................................................... 398/106
See application file for complete search history.

(56) References Cited

U.S. PATENT DOCUMENTS 6,424,285 B1 * 7/2002 Perdue .................... G08C 17/02 341/176
2003/0147006 A1 * 8/2003 Graef ...................... H04B 1/202 348/552
2006/0210278 A1 * 9/2006 Cregg .................... G08C 23/04 398/107
2011/0299854 A1 * 12/2011 Jonsson ............... H04B 10/116 398/106

OTHER PUBLICATIONS

"NEC Infrared Transmission Protocol," Altium, Nov. 6, 2013, 2 pgs., found: http://techdocs.altium.com/display/FPGA/NEC+Infrared+Transmission+Protocol#comment-0.

* cited by examiner

*Primary Examiner* — Don N Vo
(74) *Attorney, Agent, or Firm* — Saile Ackerman LLC; Stephen B. Ackerman

(57) ABSTRACT

An infrared signal generator with an interface for receiving an encoded infrared command; and protocol generation circuitry for generating a bitstream that comprises one or more data words that comprise data to be transmitted and one or more protocol words that describe symbols of an infrared protocol is presented. Optionally, the protocol generation circuitry comprises a first circuit for generating a data word and a second circuit for generating a protocol word. Optionally, the infrared signal generator comprises a carrier frequency generator which is selectively combined with the output of either the first circuit or the second circuit to provide a drive signal for an infrared transmitter.

15 Claims, 4 Drawing Sheets

INFRA-RED WIRELESS COMMUNICATION

TECHNICAL FIELD

The present disclosure relates to infra-red wireless communication, and in particular to generating digital messages and the generation of commands according to any one of multiple infra-red communications protocols.

BACKGROUND

Infrared is widely used in remote control applications since it is relatively cheap and straightforward to implement. In a remote control system and as illustrated in FIG. 1, a controller device 100 comprises an infrared transmitter 102 such as a light emitting diode (LED) or equivalent and a target device 104 contains an infrared receiver 106. Commands are sent by the controller device to the target device to perform various functions. The transmitted IR radiation is modulated and encoded so that a sequence of logic ones and zeros (highs and lows) can be received and interpreted by the target device 104. Different sequences of logic ones and zeros can correspond to different commands.

In order for the commands sent by the controller device to initiate their intended function at the target device, the two devices must operate with the same communications protocol, or with communications protocols that are compatible. However there are many infrared communications protocols, and multiple vendors each have their own proprietary infrared communications protocols which they often do not publish. This means that a controller device can generally only be used with one target device or a limited number of different target devices. In a domestic context, multiple remote control units must be used to control consumer electronic devices in a house, which is inconvenient and inefficient.

Various universal remote controls have been proposed. Usually, the controller device comprises a microcontroller which is fully occupied to actively control the encoding and modulation of a carrier signal according to the desired protocol implementation. This technique consumes a lot of power due to the heavy workload of the microcontroller.

SUMMARY

There is a need for a system to provide an improved way of generating digital messages, ideally with improved power efficiency. According to a first aspect of the disclosure there is provided an infrared signal generator comprising: an interface for receiving an encoded infrared command; and protocol generation circuitry for generating a bitstream that comprises one or more data words that comprise data to be transmitted and one or more protocol words that describe symbols of an infrared protocol.

Optionally, the protocol generation circuitry comprises a first circuit for generating a data word and a second circuit for generating a protocol word.

Optionally, the infrared signal generator comprises a carrier frequency generator which is selectively combined with the output of either the first circuit or the second circuit to provide a drive signal for an infrared transmitter.

Optionally, each protocol word comprises a field defining a logic state and a duration.

Optionally, the symbols described by the protocol words comprise one or more of: a header symbol, a gap symbol, a tail symbol.

Optionally, the data word comprises a length field that denotes the number of valid bits in a data payload.

Optionally, the data words and protocol words comprise a field that defines a word type as being either a protocol word or a data word.

According to a second aspect of the disclosure there is provided an infrared controller device comprising: a user interface for receiving user commands; a controller for transforming the user commands to encoded infrared command signals; and an infrared signal generator for transforming the encoded infrared command signals into a drive signal for an infrared transmitter; and an infrared transmitter coupled with said infrared signal generator; wherein the infrared signal generator comprises an interface for receiving an encoded infrared command and protocol generation circuitry for generating a bitstream that comprises one or more data words that comprise data to be transmitted and one or more protocol words that describe symbols of an infrared protocol.

According to a third aspect of the disclosure there is provided a method of generating an infrared signal, comprising: receiving an encoded infrared command signal, and transforming the command signal into an infrared signal by generating a bitstream that comprises one or more data words that comprise data to be transmitted and one or more protocol words that describe symbols of a communications protocol.

Optionally, each protocol word comprises a field defining a logic state and a duration.

Optionally, the symbols described by the protocol words comprise one or more of: a header symbol, a gap symbol, a tail symbol.

Optionally, the data word comprises a length field that denotes the number of valid bits in a data payload.

Optionally, the data words and protocol words comprise a field that defines a word type as being either a protocol word or a data word.

BRIEF DESCRIPTION OF THE DRAWINGS

The disclosure will be described below, by way of example only, with reference to the accompanying drawings, in which.

DESCRIPTION

In IR communication, the IR transmitter (typically an LED) is generally modulated according to a chosen carrier frequency. A receiver at a target device will be tuned to detect signals at that frequency.

Time periods through the course of which the IR transmitter is active are referred to as “marks”, and time periods through the course of which it is inactive are referred to as “spaces”. The marks and spaces are encoded in order to transmit data comprising encoded commands. Various encoding methods may be used, which define different ways of processing marks and spaces to form different logic states (ones and zeros).

In a pulse distance encoding method, the duration of a pulse that defines a mark is constant, but the time between consecutive marks is varied, with a long delay between marks representing a first logic state (a "one" by convention) and a short delay between marks representing a second logic state (a "zero" by convention).

In a pulse width encoding method, the duration of a pulse that defines a mark is relatively long to represent a first logic state (a "one" by convention) and relatively short to represent a second logic state (a "zero" by convention).

In a Manchester encoding method, a pulse that defines a mark takes place in either a first or a second half of a bit period to define either first or second logic states. This means that a mid-period transition from high to low represents a first logic state (a "zero" by convention) and a mid-period transition from low to high represents a second logic state (a "one" by convention).

In a frequency shift keying (FSK) encoding method, different modulation frequencies are used to represent different logic states. The two carrier frequencies are generated and multiplexed accordingly.

In a baseband encoding method, no carrier frequency is used. The IR transmitter sends short baseband pulses which are pulse distance encoded for representing different logic states.

The present disclosure is not restricted to any one encoding method and can implement any of these methods or various other encoding methods.

Different IR protocols may have different modulation carrier frequencies and different encoding methods. Furthermore, the duration of a mark and a space may be different for different protocols.

As seen from this discussion, the marks and spaces are not necessarily an integer multiple of each other. Because of this, the data that is transmitted according to the protocol must be modelled by ones and zeros which are described in terms of a number of carrier clock cycles.

In addition to these variables, protocols may define one or more of header symbols, gap symbols and tail symbols. These symbols comprise specific pulses or delays which are transmitted between the ones and zeros which make up the actual command and are used for synchronisation of communication, marking the start or end points of the command or of its component parts.

Figure 1:
FIG. 1 shows a remote control system comprising a controller device and a target device.
Figure 2:
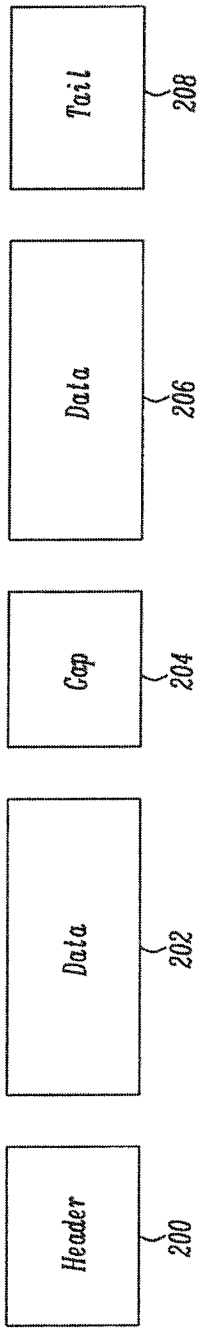
FIG. 2 shows a generic IR communications protocol.

FIG. 2 shows a generic representation of a practical IR communications protocol. A protocol data unit may be provided as a message which comprises a number of words. The message comprises a header 200, data portions 202, 206 with an interposing gap 204, and a tail 208. Each of these portions 200-208 may comprise one or more words. One of the data portions 202, 206 comprises a command, optionally together with its logical inverse and the other of the data portions 202, 206 comprises an address, optionally together with its logical inverse. The logical inverses of the command and the address may be provided for error checking. The address may be used for example to identify a device, with different devices usually being different types of devices from the same manufacturer. The data portions 202, 206 may also comprise more data than just the command and address, but still form part of a "command" or "address" bitstream.

The header, gap and tail symbols 200, 204, 208 are in fact optional. Different protocols use these symbols in different ways. The number and types of symbol (header, tail or gap) used, as well as the duration of the marks and spaces that make up the symbols, can vary between different protocols.

The symbols may be formed of marks and/or spaces, but the duration of a mark and the duration of a space could be totally different from each other. Marks and spaces may also alternate one or more times, and the timing of marks and spaces of the protocol symbols is unrelated to the marks and spaces of the ones and zeros of the data portions.

The symbols cannot generally be encoded as ones and zeros in the way that the marks and spaces of the command data can, because the duration of pulses that would form a mark and pulses that would form a space might vary significantly. Furthermore, finding a minimum pulse duration which works for both protocol symbols and logic ones/zeros is not always possible. If the minimum pulse duration is too short, then the number of pulses needed to represent a symbol could be prohibitively large while if the minimum pulse duration is too long, then the length of time that is needed to transmit data becomes prohibitively long.

Therefore, differences between header, gap and tail symbols between different protocols represents a barrier to implementing a universal remote control system. If the symbols are not understood it becomes difficult or impossible to properly synchronise the commands and so this leads to errors and data loss of the data to be transmitted.

Figure 3:
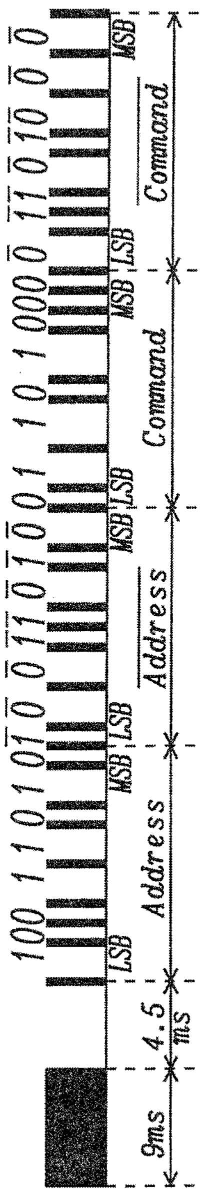
FIG. 3 illustrates aspects of the NEC IR protocol.

As an example, FIG. 3 shows the format of the NEC IR protocol. In this protocol, a logical zero is transmitted as a 562.5 μs pulse burst followed by a 562.5 μs space and a logical one is transmitted as a 562.5 μs pulse burst followed by a 1.6875 ms space. As shown in the figure, a transmitted protocol data unit (message) comprises a header which has a 9 ms leading pulse burst and a 4.5 ms space, a first data portion comprising an address bitstream with an 8-bit address for the receiving device and the 8-bit logical inverse of the address, a second data portion comprising an 8-bit command and the logical inverse of the 8-bit command, and a tail comprising a final 562.5 μs pulse burst to signal the end of the transmission. This is an example of a protocol that does not have a gap between the address and command bitstreams.

A message of a communications protocol can therefore be characterised as having two different types of word. A first word type is for transmitting protocol symbols and a second word type is for transmitting data. Afield of each word (preferably the most significant bit) forming part of a message can be set to define its type. The words can then be decoded differently depending on their type.

The first word type (for transmitting protocol symbols) may be referred to as a protocol word. Each protocol word can comprise a logic state (mark or space) and a duration. This efficient structure allows for a flexible "painted" waveform to be defined for the representation of protocol symbols.

For the selected example of a message that comprises 16-bit words, the encoding of a protocol word can be expressed in the following table:

| Bit | Name | Description |
|---|---|---|
| 15 | Message Type | 0 = Protocol Word |
| 14 | Symbol Type | 1 = Mark |
| | | 0 = Space |
| 13:0 | Duration | Mark or Space duration in carrier clock cycles |

Applying this to the specific example of the NEC protocol illustrated in FIG. 3, the NEC header would be represented by two protocol words, the first defining a mark duration of a number of carrier clock cycles that provides a 9 ms burst and the second defining a space duration of a number of carrier clock cycles that provides a 4.5 ms gap; and the tail would be represented by a protocol word defining a mark duration of a number of carrier clock cycles that provides a 562.5 μs gap. The number of clock cycles may correspond exactly to the relevant time periods (9 ms, 4.5 ms, 562.5 μs), or may be lengthened by a certain amount (for example, 5 ms) to build in some tolerance to the system.

The second word type (for transmitting data) may be referred to as a data word. This word comprises a payload of marks and spaces and has clearly defined mark and space durations and sequence. A data word may also comprise a length field that denotes the number of valid bits in the payload.

As a specific example, for the case of a message that comprises 16-bit words, the encoding of a data word can be expressed in the following table:

| Bit | Name | Description |
|---|---|---|
| 15 | Message Type | 1 = Data word (meaning that the message information itself defines logic "1" or logic "0") |
| 14:11 | Message Length | Number of valid bits |
| 10:0 | Message Payload | Digital Message consisting of logic '1's and logic '0's |

Figure 4:
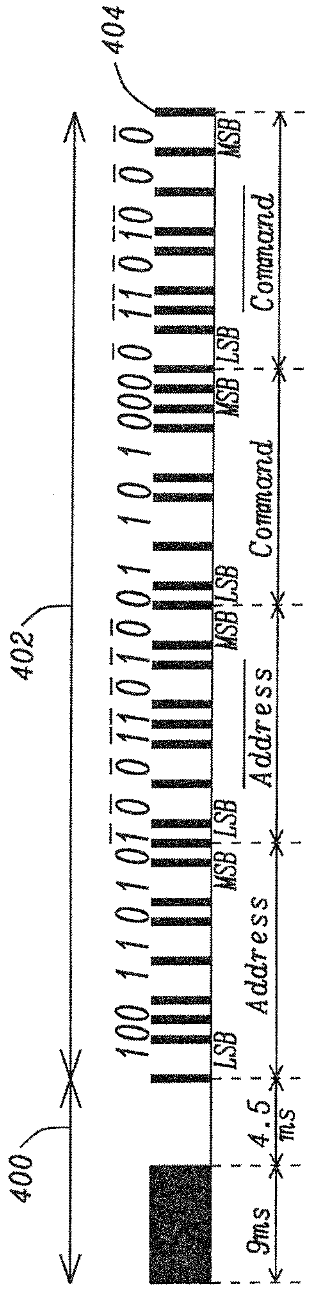
FIG. 4 illustrates an embodiment of the disclosure, as applied to the NEC IR protocol shown in FIG. 3.

FIG. 4 shows the allocation of protocol and data words for the NEC protocol of FIG. 3. Here, a message header 400 comprises protocol words (one word for the 9 ms leading pulse burst and one word for the 4.5 ms space). The address/command 402 part of the message comprises data words (one word for each of the address, the logical inverse of the address, the command and the logical inverse of the command). The tail 404 part of the message comprises a protocol word (specifying the final 562.5 μs pulse burst).

Then, the address and command bitstreams of the waveform shown in FIG. 4 can be encoded as follows:

| Word (16-bits) | Bit 15 | Bits[14:11] | Bits[10:0] | Remarks |
|---|---|---|---|---|
| 1 | 1 | 0xA | $100110101\overline{1}$ | This is a digital word. 10 bits are valid. |
| 2 | 1 | 0xA | $\overline{0011010}011$ | This is a digital word. 10 bits are valid. |
| 3 | 1 | 0xA | $01000\overline{01101}$ | This is a digital word. 10 bits are valid. |
| 4 | 1 | 0x3 | $xxxxxxx\overline{000}$ | This is a digital word. 3 bits are valid. |

The header may be encoded according to the protocol word format as follows:

| Word (16-bits) | Bit 15 | Bits14 | Bits[13:0] | Remarks |
|---|---|---|---|---|
| 1 | 0 | 1 | 0x144 | Header: This is a paint message, a mark symbol of 324 clock cycles duration |
| 2 | 0 | 0 | 0xA2 | Header: This is a paint message, a space symbol of 162 clock cycles duration |

Similarly, the tail may be encoded according to the protocol word format as follows:

| Word (16-bits) | Bit 15 | Bits14 | Bits[13:0] | Remarks |
|---|---|---|---|---|
| 1 | 0 | 1 | 0x15 | Tail: This is a paint message, a mark symbol of 21 clock cycles duration |

An NEC protocol command can therefore be transmitted with seven 16-bit encoded words. According to the disclosure an infrared (IR) signal generator is provided. The IR signal generator produces a modulated and encoded signal for driving an infrared transceiver, and can support any given IR protocol version.

IR commands may be encoded in hardware an effective manner which reduces the engagement of a microcontroller or CPU as compared with known approaches and consequently reduces power consumption for the encoding of commands. The flexible generation of messages using protocol words and data words ensures universality, namely, the ability to encode any given IR protocol.

Figure 5:
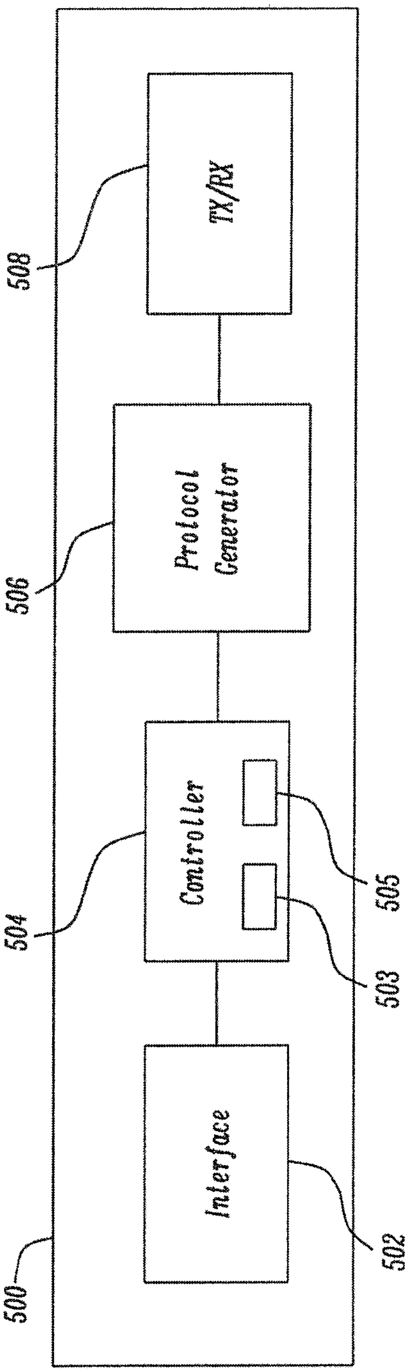
FIG. 5 illustrates the structure of a controller device according to an embodiment of the disclosure.

FIG. 5 schematically illustrates the general principle of a universal IR controller device 500 according to an embodiment of the disclosure. A user interacts with an interface 502 which may for example comprise a keypad, navigation pad, touch screen, optical pointing device, trackpad, or various other user interface elements. The user interface elements are operated by a user to input user commands such as "volume up/down" or "channel up/down", and are coupled with a controller 504 which receives inputs from the user interface and generates command signals. The user interface 502 may be used to select different sources, that is, different target devices to be controlled, and then to input commands for the selected target devices. Hybrid style control schemes may also be enabled for scenarios where multiple devices are used for media playback. In such a hybrid scheme a preset group of devices may be selected and switched on via a macro operated with a single user interaction, and the different user interface elements or user actions could control different devices depending on the group of devices that is selected.

The controller 504 comprises a central processing unit (CPU) 503 and a memory 505 for storing protocol parameters. Normally there will be one set of parameters stored for each device that is to be controlled by the universal IR controller device. However it is also possible to reduce the amount of memory required by deduplication of data if different protocols share similar parameters.

When the user interacts with the interface 502 (for example by pressing a button), the controller 504 generates a command which is encoded according to IR protocol parameters stored in the memory 505. The encoded command is sent by the controller 504 to an IR signal generator 506, which exchanges control signals with a transceiver 508. The transceiver 508 may comprise an optical element which may be an IR LED or equivalent. In alternative embodiments the transceiver 508 may be replaced with a transmitter or a receiver. The interface between the controller 504 and the IR signal generator 506 may be any suitable data bus, such as an AMBA APB (Advanced Microcontroller Bus Architecture Advanced Peripheral Bus) or UART (Universal asynchronous receiver/transmitter) interface. In alternative embodiments two or more of the controllers 504, IR signal generators 506 and transceivers 508 may be provided as part of the same integrated circuit or provided on a common substrate.

For transmitting a command to a target device, the IR signal generator 506 receives the encoded IR commands, then decodes them into protocol words and data words which are then used to drive the transceiver 508. For receiving a command, the IR signal generator 506 decodes a signal received via the transceiver 508 and provides an instruction for the controller 504. The components illustrated in FIG. 5 may be provided as component parts of a controller device or a target device in a remote control system, or generally for any device which transmits and/or receives signals.

The IR signal generator 506 comprises a memory that receives and stores encoded IR commands from the controller 504, and circuitry that decodes the encoded IR commands and generates protocol words and data words. The circuitry may comprise a dedicated decoder circuit, a first circuit that is specifically for generating protocol words and a second circuit that is specifically for generating data words, although in alternative arrangements a combined circuit may be provided. The first and second word generator circuits and/or the decoder circuit may also be effectively sub-components of a larger circuit. The controller 504 comprises a central processing unit (CPU) 503 that sends encoded IR commands to the IR signal generator 506. The encoded IR commands are generated in processor micro-code, the format of which will depend on the specific CPU and data bus architecture. These encoded IR commands are then converted by the IR signal generator 506 into a drive signal for driving the transceiver 508.

The CPU of the controller 504 writes protocol parameters to the memory 505 of the controller 504, but this will generally be a one-time procedure that is applied when a new device is added to the controller or when a protocol for a device needs to be updated. New protocols can be written to the memory 505 from an external source (for example, by downloading protocols from the internet, either directly or via a connection with a host computing device), or be learned by exchanging a sequence of commands with a target device, or be programmed directly.

During everyday use of the controller device for controlling a target device, the CPU only needs to send the encoded IR commands. The actual generation of the transceiver drive signal is handled by the IR signal generator 506, using components including the circuitry that generates protocol words and data words. This is in contrast to existing universal remote controls where the CPU has to process the transceiver drive signal. This means the present disclosure provides a more power efficient solution.

Furthermore, the present disclosure provides a flexible system for implementing any IR protocol. Full flexibility is ensured by describing the encoded commands as protocol words or data words, so that the protocol symbols can be "painted" with a custom waveform.

Figure 6:
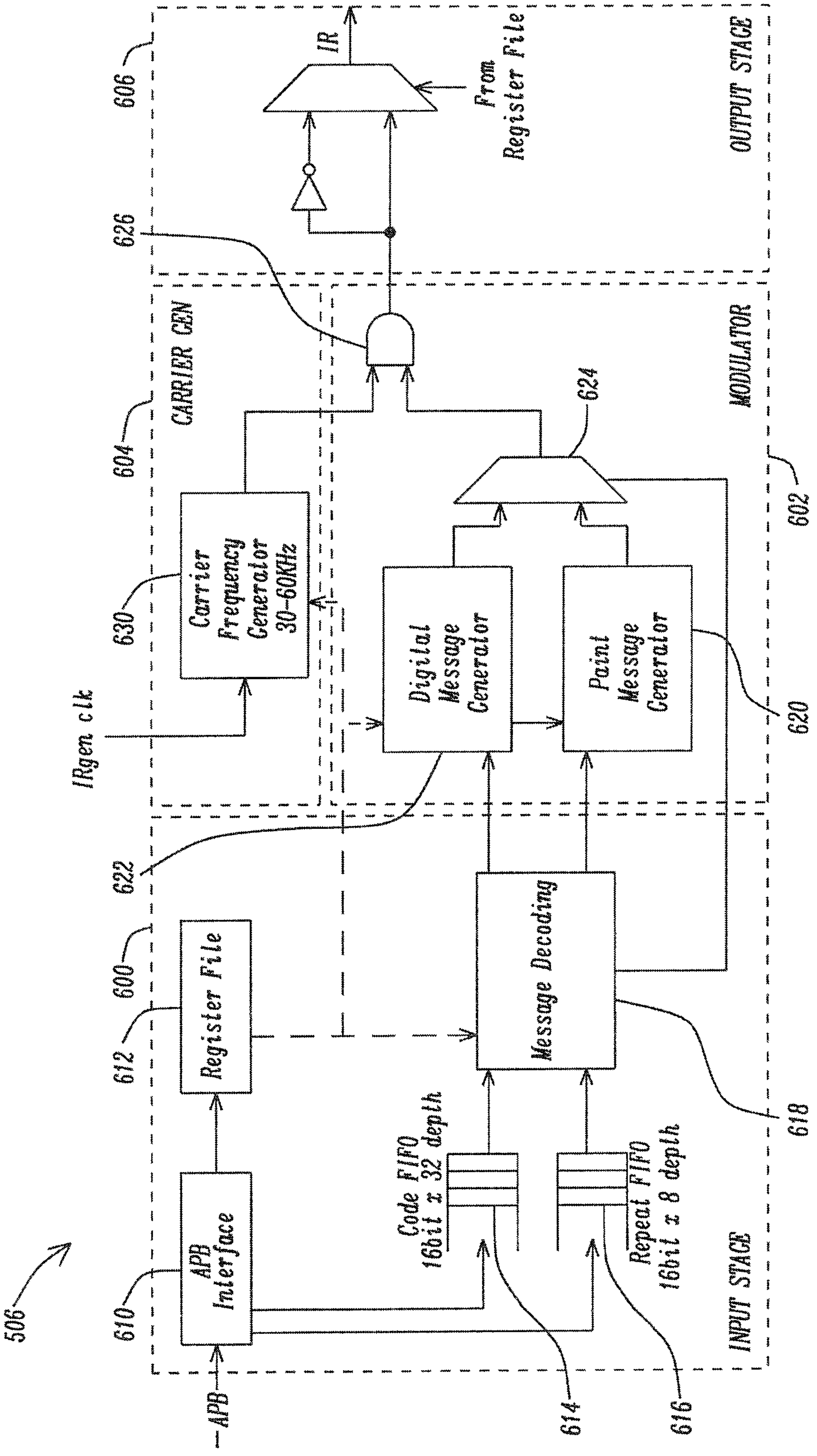
FIG. 6 illustrates aspects of an IR signal generator according to an embodiment of the disclosure.

FIG. 6 illustrates an embodiment of an IR signal generator 506 according to the disclosure. Here, the generator 506 comprises an input stage 600, a modulator 602, a carrier generator 604 and an output stage 606, as delineated by the dashed lines in the figure.

The input stage 600 comprises an interface 610, a memory 612 for storing hardware parameters, a first command memory 614 and a second command memory 616 for storing words received via the interface 610, and a message decoder 618.

The interface 610 is an interface for communication with a data bus such as an AMBA APB, UART or equivalent. The hardware memory 612 may comprise register files.

The first and second command memories 614, 616 may suitably comprise first-in-first-out (FIFO) logic blocks, and in a preferred embodiment one command memory 614 is a word memory that may receive and store encoded words and the other command memory 616 is a repeat memory for the loading of special commands for repeating a key press. The input stage 600 may also start a repeat timer when a key is constantly pressed by a user. The repetition time as well the message to be sent may according to the protocol.

The outputs of the word memory 614 and repeat memory 616 are decoded by the decoder 618 and sent on to the modulator 602, which generates a modulation signal which gates a carrier clock pulse train.

The modulator 602 comprises a protocol word generator 620 and a data word generator 622, and a selection element 624 such as a state machine which selects between a data word or a protocol word. A gate 626 combines the output of the selection element 624 with that of a carrier generator 604.

The carrier generator 604 is responsible for generating the carrier frequency for modulation of the transmitted pulses. It may comprise its own gated clock 630. For IR applications, the clock may suitably have a clocking frequency of up to 16 MHz and can generate frequencies in the range of 30-60 KHz.

The output stage 606 receives inputs from the gate 626 to generate a drive signal for a transceiver which comprises an IR LED or equivalent light emitting device. The output stage 606 may also be optionally programmed to invert the output.

As mentioned above, the memory 612 may comprise register files which define hardware parameters. The parameters may include signal high and low durations for a carrier signal, mark and space durations for a logic one, mark and space durations for a logic zero, control parameters, IR status (including whether the generator is busy or idle and the amount of words in the word memory and repeat memory), repeat time in carrier clock cycles, word memory data write port, repeat memory data write port, and interrupt request status.

The control parameters (being amongst the hardware parameters stored in memory 612) may for example define: the polarity of an interrupt signal, the enabling or masking of interrupt generation upon completion of transmission, the format of a logic one, the format of a logic zero (ones and zeros may start with a mark followed by a space or vice versa), the inversion or not of the output, the definition of a repeat command at the word memory or the repeat memory, the transmission or stopping of an IR command, the enabling or disabling of an IR block, reset of the word memory, reset of the repeat memory.

The commands are optimized to occupy minimum words resulting to a very small footprint. The power required for the transmission of the code which applies to a specific key press on a remote control is low because of a reduced memory footprint and reduced CPU engagement as compared with existing solutions.

Various improvements and modifications may be made to the above without departing from the scope of the disclosure.

What is claimed is:

1. An infrared signal generator comprising:

an interface for receiving an encoded infrared command from a controller;

a decoder for decoding the encoded infrared command; and protocol generation circuitry for generating a bitstream based on the decoded infrared command; wherein the bitstream comprises one or more data words that comprise data to be transmitted and one or more protocol words that describe symbols of an infrared protocol;

and components for generating a drive signal using the protocol words and the data words.

2. The infrared signal generator of claim 1, wherein the protocol generation circuitry comprises a first circuit for generating a data word and a second circuit for generating a protocol word.

3. The infrared signal generator of claim 2, comprising a carrier frequency generator which is selectively combined with the output of either the first circuit or the second circuit to provide a drive signal for an infrared transmitter.

4. The infrared signal generator of claim 1, wherein each protocol word comprises a field defining a logic state and a duration.

5. The infrared signal generator of claim 1, wherein the symbols described by the protocol words comprise one or more of: a header symbol, a gap symbol, a tail symbol.

6. The infrared signal generator of claim 1, wherein the data word comprises a length field that denotes the number of valid bits in a data payload.

7. The infrared signal generator of claim 1, wherein the data words and protocol words comprise a field that defines a word type as being either a protocol word or a data word.

8. An infrared controller device comprising:

a user interface for receiving user commands;

a controller for transforming the user commands to encoded infrared command signals; and an infrared signal generator for transforming the encoded infrared command signals into a drive signal for an infrared transmitter; and an infrared transmitter coupled with said infrared signal generator;

wherein the infrared signal generator comprises an interface for receiving the encoded Infrared command; a decoder for decoding the encoded infrared command; a protocol generation circuitry for generating a bitstream based on the decoded infrared command; wherein the bitstream comprises one or more data words that comprise data to be transmitted and one or more protocol words that describe symbols of an infrared protocol; and components for generating the drive signal using the protocol words and the data words.

9. A method of generating an infrared signal, comprising the steps of:

receiving an encoded infrared command signal from a controller, decoding, with a decoder, the encoded infrared command, transforming the command signal into an infrared signal by generating a bitstream based on the decoded infrared command; wherein the bitstream comprises one or more data words that comprise data to be transmitted and one or more protocol words that describe symbols of a communications protocol; and generating a drive signal using the protocol words and the data words.

10. The method of claim 9, wherein the protocol generation circuitry comprises a first circuit for generating a data word and a second circuit for generating a protocol word.

11. The method of claim 10, further comprising the step of: providing a carrier frequency generator which is selectively combined with the output of either the first circuit or the second circuit to provide a drive signal for an infrared transmitter.

12. The method of claim 9, wherein each protocol word comprises a field defining a logic state and a duration.

13. The method of claim 9, wherein the symbols described by the protocol words comprise one or more of: a header symbol, a gap symbol, a tail symbol.

14. The method of claim 9, wherein the data word comprises a length field that denotes the number of valid bits in a data payload.

15. The method of claim 9, wherein the data words and protocol words comprise a field that defines a word type as being either a protocol word or a data word.

* * * * *